(12) United States Patent
Clemence et al.

(10) Patent No.: US 11,108,301 B2
(45) Date of Patent: Aug. 31, 2021

(54) TURBOGENERATOR ROTOR, TURBOGENERATOR, AND METHODS OF FURNISHING A TURBOGENERATOR WITH A BAFFLE ASSEMBLY

(71) Applicant: General Electric Technology GmbH, Baden (CH)

(72) Inventors: Laurent Clemence, Belfort (FR); Duncan Madle, Belfort (FR); Pierreyves Ronan David, Belfort (FR); Laurent Viain, Belfort (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 346 days.

(21) Appl. No.: 16/242,493

(22) Filed: Jan. 8, 2019

(65) Prior Publication Data

US 2019/0214886 A1 Jul. 11, 2019

(30) Foreign Application Priority Data

Jan. 8, 2018 (EP) .................................... 18290001

(51) Int. Cl.
*H02K 9/00* (2006.01)
*H02K 9/12* (2006.01)
*H02K 1/20* (2006.01)
*H02K 1/32* (2006.01)

(52) U.S. Cl.
CPC ................ *H02K 9/12* (2013.01); *H02K 1/20* (2013.01); *H02K 1/32* (2013.01); *H02K 2201/03* (2013.01)

(58) Field of Classification Search
CPC ........ H02K 2201/03; H02K 9/00; H02K 9/10; H02K 9/12; H02K 1/20; H02K 1/32
See application file for complete search history.

(56) References Cited

U.S. PATENT DOCUMENTS

| 4,051,400 | A |   | 9/1977 | Armor et al. |
| 4,324,993 | A |   | 4/1982 | Sato et al. |
| 4,383,191 | A | * | 5/1983 | Mizuyama ............... H02K 9/18 310/269 |
| 4,609,840 | A | * | 9/1986 | Eats ........................ H02K 9/00 310/58 |
| 4,654,550 | A | * | 3/1987 | Lowther ................. H02K 9/00 310/59 |

(Continued)

FOREIGN PATENT DOCUMENTS

| EP | 0562534 A1 | 9/1993 |
| JP | S54159610 A | 12/1979 |
| JP | S5742558 A | 3/1982 |

OTHER PUBLICATIONS

European Search Report and Written Opinion dated Jun. 14, 2018 which was issued in connection with EP 18290001.9 which was filed on Jan. 8, 2018.

*Primary Examiner* — Dang D Le
(74) *Attorney, Agent, or Firm* — Grogan, Tuccillo & Vanderleeden, LLP

(57) ABSTRACT

Disclosed is a turbogenerator rotor, the rotor including a rotor body having two axial ends. The rotor further including a trunnion axially extending from each axial end of the rotor body. the rotor further including at least one baffle assembly provided on the circumference of the rotor body, the baffle assembly including at least one baffle member reversibly attached to the rotor body.

14 Claims, 1 Drawing Sheet

(56) References Cited

U.S. PATENT DOCUMENTS

| | | | | |
|---|---|---|---|---|
| 4,682,064 A | * | 7/1987 | Crounse | H02K 9/18 |
| | | | | 310/61 |
| 5,177,385 A | * | 1/1993 | Cooper | H02K 1/185 |
| | | | | 310/53 |
| 2005/0151430 A1 | | 7/2005 | Lowther | |

* cited by examiner

TURBOGENERATOR ROTOR, TURBOGENERATOR, AND METHODS OF FURNISHING A TURBOGENERATOR WITH A BAFFLE ASSEMBLY

TECHNICAL FIELD

The present disclosure relates to a turbogenerator rotor.

BACKGROUND OF THE DISCLOSURE

In turbogenerators, an axially extending circumferential gap is provided between the body of the rotor and the stator. Airgap baffles are used to restrict and/or control a gas flow in said gap. CN 202309379 discloses a turbogenerator in which a baffle is attached to the stator at an axial end of the airgap. According to the teaching of CN 202309379, the baffle essentially closes the gap, thus at least essentially blocking gas flow into the gap through the axial ends of the gap. The baffle disclosed in CN 202309279 comprises a baffle ring fixedly attached to the stator, while a second baffle member is attached to the baffle base ring. The second baffle member, in turn, bears a rubber sealing to seal against the rotor. Other known turbogenerators, however, rely on component cooling effected by a gas flow into and through the gap and through at least one axial end of the gap. It is desirable to provide an airgap baffle in order to narrow the airgap and adjust a residual gap width so as to allow a controlled air—or, more generically, other gas—flow therethrough to provide a coolant flow in and through the rotor-stator gap.

In certain types of generators, the rotor is equipped with an internal cooling system, while cooling of the stator relies, at least in part, on air or other gas flowing through the gap. This is achieved in providing a baffle on the rotor body to restrict the gap at an axial end of the gap, while leaving a residual gap open at the outer diameter of the gap adjacent the stator. The baffle and the attachment of the baffle assembly to the rotor in such cases need to be able to withstand the centrifugal forces due to rotation of the rotor. It is known in the art to provide baffles which are manufactured directly on the outer diameter of the rotor, for instance from glass roving material. While this type of baffles yield a proven record, such baffles on the other hand yield certain drawbacks. For one instance, they need to be manufactured directly on a member of the generator. A method in which a baffle ring is manufactured directly on the rotor, for instance by wrapping and polymerizing a glass tape around the rotor body, requires specific tools and qualified operators. Curing a glass epoxy baffle may require a couple of days, during which other work on the member is strongly hampered. In particular during service works, manufacturing a baffle in situ lies on the critical path and may interfere with critical timelines. The baffle is non-releasably attached to the rotor. Thus, when replacing a baffle, the used baffle needs to be destructively removed. This removal, and subsequent cleansing of the interface surface so as to prepare the baffle-rotor interface to be furnished with a new baffle, is further time consuming and may thus further extend outage time. Extending the critical time path and the requirement for qualified and skilled personnel significantly add cost. Finally, manufacturing the baffle in situ allows a lower degree of process control than a manufacturing process in a factory.

BRIEF SUMMARY

It is an object of the present disclosure to provide a turbogenerator rotor of the type initially mentioned. It is a more specific object of the present disclosure to provide an improved turbogenerator rotor. More specifically, the herein disclosed subject matter is intended to overcome certain drawbacks of the art. In an aspect, it is an object of the present disclosure to improve manufacture and maintenance of the turbogenerator rotor. In more specific aspects, the manufacture and maintenance of the turbogenerator rotor shall be rendered more economically. In more specific aspects, the time for manufacturing or maintenance of the turbogenerator rotor shall be shortened. In other more specific aspects, the manufacturing or maintenance of the turbogenerator rotor shall be facilitated such as to require less specifically trained personnel. In still further aspects, manufacturing of the baffle shall be facilitated. In other more specific aspects, it is an object of the present disclosure to provide a turbogenerator rotor in which a baffle may be refurbished and reused.

Further effects and advantages of the disclosed subject matter, whether explicitly mentioned or not, will become apparent in view of the disclosure provided below.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

Accordingly, disclosed is a turbogenerator rotor comprising a rotor body. The rotor body has two axial ends, wherein the rotor further comprises a trunnion axially extending from each axial end of the rotor body. At least one baffle assembly is provided on the circumference of the rotor body. In more specific embodiments, the baffle assembly circumferentially extends around the rotor body. The baffle assembly comprises at least one baffle member which is reversibly attached to the rotor body. In more specific embodiments all baffle members are reversibly attached to the rotor body. Reversible attachment means that the baffle member may be nondestructively removed from the rotor body. In particular embodiments, all baffle members are reversibly attached to the rotor body. The baffle assembly may in particular be provided adjacent an axial end of the rotor body. In more particular embodiments, two baffle assemblies may be provided which are axially spaced from each other, and in particular adjacent each axial end of the rotor body.

Reversible attachment may comprise, while not being limited to, attachment via removable positive-locking elements or gluing.

In that a baffle member is reversibly attached to the rotor body, it may be detached from the rotor without damaging the baffle member and without potential damage or soiling of the baffle-rotor interface surface of the rotor. The baffle member may in certain embodiments be refurbished and reused.

In further aspects the at least one baffle assembly comprises or consists of at least one pre-manufactured structural baffle member. The pre-manufactured structural baffle member may comprise a circular ring and/or a circular ring segment. Providing pre-manufactured structural baffle members yields the advantage that they may be provided off-shelf as standard components and may be manufactured as standard components, which potentially yields further cost advantages. It is further appreciated that manufacturing a structural baffle member in the controlled environment of a factory yields potential quality gains. The handling for personnel is facilitated, which results in timeline improvements and a reduced requirement for highly qualified and specifically trained personnel.

A radial gap may be provided between the at least one baffle member, or the baffle assembly, respectively, and the rotor body. Such play between a baffle member and the rotor body may prove beneficial in order to further facilitate assembly and disassembly. For instance, a baffle member which is provided as a closed ring may easily be axially displaced on the rotor body when a radial play is provided. Moreover, higher manufacturing tolerances may be acceptable, which further facilitates manufacturing of the baffle member and reduces cost. A gasket may be provided between the at least one baffle member, or the baffle assembly, respectively, and the rotor body, whereby the radial gap is closed. It is understood that the gasket may in particular be an elastic gasket. The gasket provides radial centering of the baffle, while providing vibration dampening.

In further instances of the herein described turbogenerator rotor, at least one baffle member may be provided with at least one through opening, which in particular may extend radially referred to the turbogenerator rotor, wherein a pin extends from the rotor body into the through opening. The pin may then serve as a positive-locking attachment element for the baffle member at least in the axial and circumferential directions of the rotor. In more specific embodiments, the pin and the through opening of the at least one baffle member are dimensioned so as to firmly fixate the at least one baffle member in the axial and circumferential directions of the rotor. To this extent, the pin may tightly fit into the through opening at least in the axial and circumferential directions.

The pin and the through opening of the at least one baffle member may in certain embodiments be dimensioned so as to enable an unrestricted displacement of the pin through the through opening along an axis of the pin. In these embodiments, the pin provides attachment of the baffle member in transverse directions of the pin, while being provided in a floating relationship in a longitudinal direction of the pin. In more specific instances, the pin provides attachment of the baffle member in axial and circumferential directions of the rotor, while providing float-mounting in the radial direction. In still other embodiments, however, the through opening may comprise a shoulder which is configured and provided to bear against one of a corresponding shoulder provided on the pin and/or a corresponding surface of a locking element provided to be attached to the pin. Such, the pin, or the pin in connection with the locking element, respectively, may serve to also provide an attachment of the baffle member in a longitudinal direction of the pin, or, in even more specific embodiments, in the radial direction of the rotor.

The pin may be provided with at least one thread and may threadedly engage the rotor body.

In still further aspects, the baffle assembly may comprise a circumferentially extending closed ring member. In particular, an inner diameter of the closed ring member may be larger than a corresponding outer diameter of the rotor body. In still further aspects, the baffle assembly may comprise at least two ring segments, wherein each ring segment exhibits an inner radius which is equal to or larger than a corresponding outer radius of the rotor body. The ring segments may jointly cover at least essentially the entire circumference of the rotor. Minor circumferential gaps may be provided between the ring segments.

The at least one baffle member may be made from a composite material, such as for instance an epoxy enforced material. The at least one baffle member may be made from a glass roving material.

The turbogenerator rotor may be provided with an internal rotor cooling system. Said internal cooling system may comprise cooling channels extending from a front face of the rotor body to a location on the circumferential lateral surface of the rotor body, which may further in particular be located between two baffle assemblies, each of which is provided adjacent an axial end of the rotor body.

A turbogenerator is disclosed which comprises a turbogenerator rotor as disclosed above.

Further disclosed is a turbogenerator comprising a stator and a rotor, wherein an axially extending radial gap is provided between the stator and a rotor body of the rotor. The gap comprises two axial ends. At at least one axial end, and in more particular embodiments at each axial end, the gap is partially constricted by a baffle assembly, while leaving a residual gap open. In particular embodiments, the residual gap measures 20% or more, 40% or more or 50% or more of the gap width between the stator and the rotor body. The baffle assembly may be a circumferentially extending baffle assembly. At least one baffle member of a baffle assembly is reversibly attached to one of an outer circumference of the rotor body and an inner circumference of the stator. The baffle assembly may in particular comprise at least one pre-manufactured structural baffle member. The rotor of the turbogenerator may in particular be a rotor as described above.

Further disclosed is a method of furnishing a turbogenerator rotor—or a turbogenerator stator—with at least one baffle assembly. The method, when applied for furnishing a turbogenerator rotor with at least one baffle assembly, comprises attaching the at least one baffle assembly to a rotor body. The method comprises pre-manufacturing at least one baffle member, thereby providing at least one pre-manufactured baffle member, and reversibly attaching the at least one pre-manufactured baffle member to the rotor body. The baffle member may in particular be manufactured off-site and be shipped to the location where the generator is located. The baffle member may be a closed annular member which fits over an axial end of the rotor body with play and is axially placed over the rotor body. In more particular embodiments, the method may comprise providing an annular baffle member with radial through holes. That radial through holes, in furnishing the turbogenerator rotor with the baffle assembly, are placed in registry with female threads provided in the rotor body. The threaded pins are subsequently placed through the through holes and are threadedly engaged with the female threads provided in the rotor body so as to extend from the rotor body and into the through holes. The pins then serve to fixate the annular baffle in the circumferential and axial directions of the rotor. The pins and the through holes may be dimensioned so as to provide a floating arrangement with the annular baffle in the radial direction. After the pins are placed, the radially outer end of the through holes may be sealed with plugs. The plugs may be glued into the through holes. Further, the method may comprise placing a gasket between the annular baffle and the rotor body.

The skilled person will readily appreciate that in a similar manner a turbogenerator stator may be furnished with a baffle assembly.

Still further disclosed is a method of refurbishing a turbogenerator rotor, or a turbogenerator stator. The method, when applied to refurbish the turbogenerator rotor, comprises detaching a used baffle assembly from the rotor, providing at least one pre-manufactured baffle member, and attaching the at least one pre-manufactured baffle member to the rotor, wherein attaching the pre-manufactured baffle member comprises applying a reversible attachment method such as to allow a later non-destructive removal of the baffle assembly. Attaching at least one pre-manufactured baffle member to the rotor may comprise methods as described above in connection with furnishing a turbogenerator rotor with at least one baffle assembly. In certain embodiments, the method may comprise refurbishing the used baffle assembly, or at least members of the baffle assembly, and re-using the refurbished baffle assembly and/or refurbished members of the baffle assembly.

It is understood that, as the baffle assembly comprises pre-manufactured members, the above-described methods may be easily applied on site, without the need to ship the rotor and/or the stator, and without the need to provide special machinery and specifically trained personnel.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a sectional part view of a turbogenerator.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

DETAILED DESCRIPTION

Figure 1:
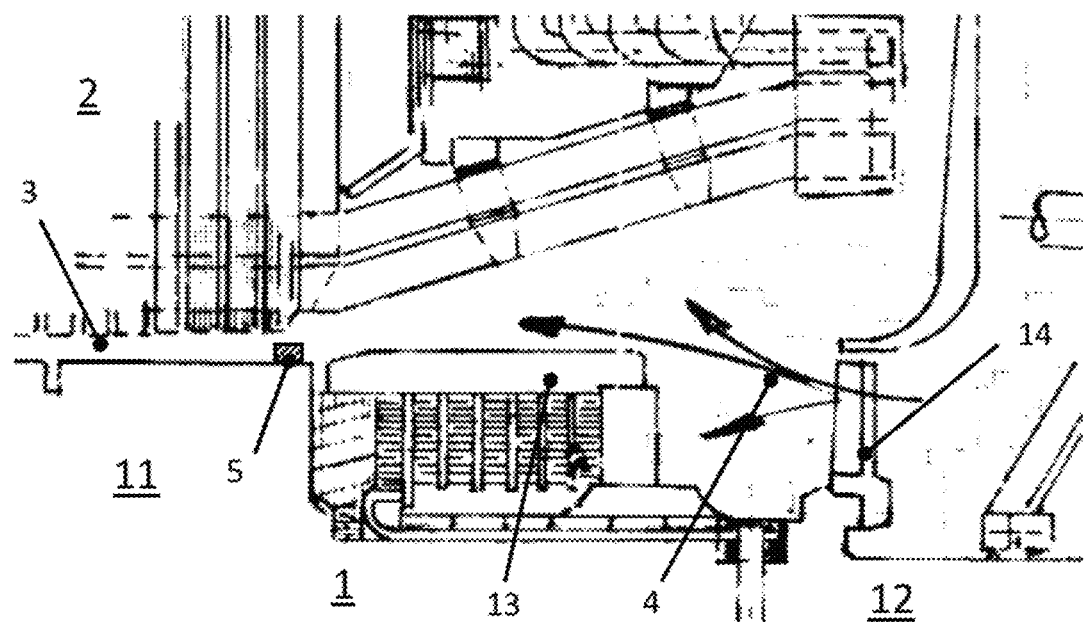

FIG. 1 shows a sectional part view of a turbogenerator comprising a rotor 1 and a stator 2. The rotor comprises rotor body 11 and a trunnion 12 extending from an axial end of the rotor body. A retainer 13 is provided circumferentially around the trunnion adjacent an axial front face of the rotor body. A radial gap 3 is formed between rotor body 11 and stator 2. During operation of the generator, a flow of air or other gas 4 is provided towards the gap for cooling the stator. In the exemplary embodiment, vanes 14 are provided on the rotor so as to generate said gas flow. A baffle assembly 5 is attached to the rotor body adjacent an axial end of rotor body 11. Baffle assembly 5 constricts gap 3 at an axial end of the gap, so as to control flow through the gap and concentrate the air or gas flow close to the stator.

Figure 2:
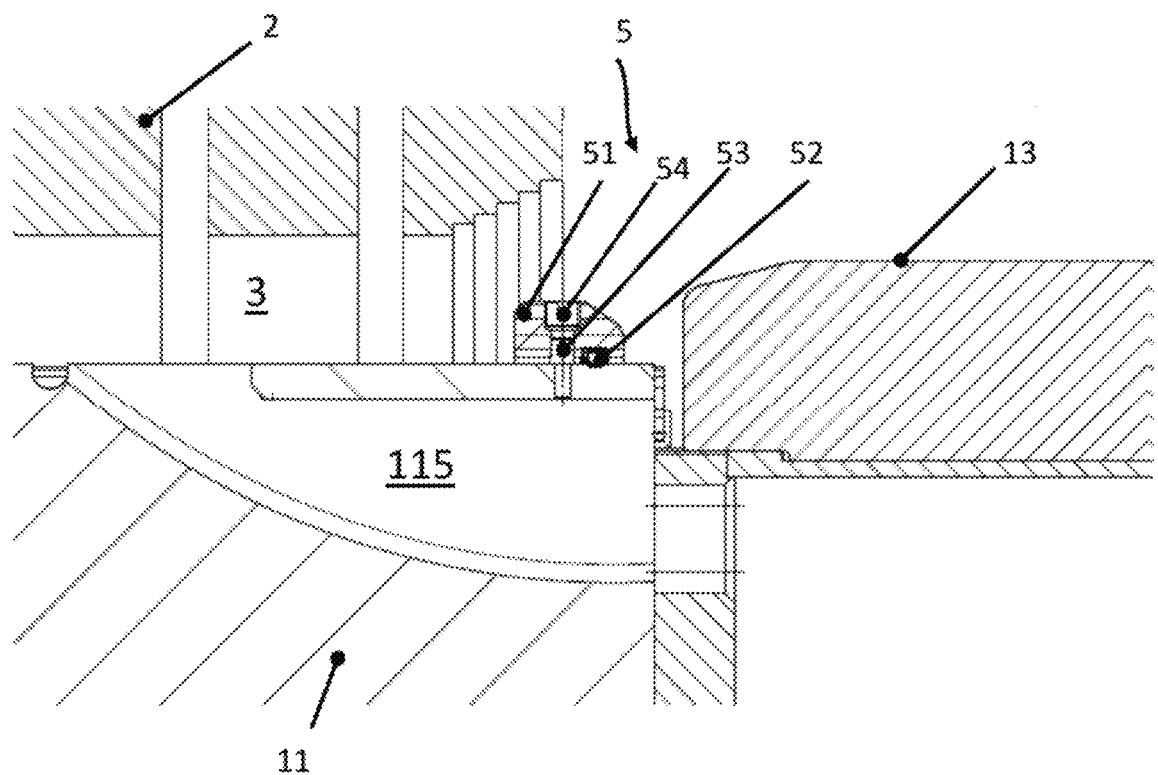
FIG. 2 a detailed view of a turbogenerator rotor which is furnished with a baffle assembly as outlined above.

FIG. 2 shows a more detailed view of an axial end region of axially extending radial gap 3. Rotor body 11 is shown in a sectional view. Cooling channel 115 extends from an axial front face of the rotor body to a location on the circumferential lateral face of the rotor body. During operation, air or other gas is directed through channel 115 from the front face of rotor body 11 and into gap 3 and effects cooling of the rotor body. As shown in connection with FIG. 1, a baffle assembly 5 is provided circumferentially extending around rotor body 11 at an axial end of gap 3. Baffle assembly 5 comprises annular baffle member 51 extending around rotor body 11. Annular baffle member 51 has an inner diameter which is larger than an outer diameter of rotor body 11. That is, annular baffle member 51 has radial play on the rotor body 11. Due to this radial play, annular baffle member 51 can easily be placed at a desired location on the rotor body through axial sliding motion. At the inner diameter, annular baffle member 51 exhibits an annular flute in which a gasket 52 is received. Gasket 52 may in particular be made from an elastic material. Gasket 52 bridges a radial gap between rotor body 11 and annular baffle member 51. Gasket 52 effects a radial centering of annular baffle member 51 and prevents chattering of annular baffle member 51 on the rotor body 11 during operation. A radial through opening is provided in annular baffle member 51. A threaded pin 53 is threadedly received in a female thread of rotor body 11. Pin 53 is slidingly received in the through opening of baffle member 51 in an axial direction of pin 53. Threaded pin 53 is provided with a tight fit with the through opening of annular baffle member 51, so as to fixate baffle member 51 on the rotor in the axial and circumferential directions. Threaded pin 53 may be installed from radially outside annular baffle member 51 through the through opening and may be screwed into the female thread of rotor body 11. After threaded pin 53 is installed, the through opening may be closed and/or sealed by plug 54. Plug 54 may be glued into the through opening. Annular baffle member 51 is a pre-manufactured structural member of baffle assembly 5. Annular baffle member 51 may be made from a roving material, for instance from a glass roving material. Plug 54 may be made from glass. Removal of baffle assembly 5 from rotor body 11 may be easily performed in first removing plug 54, unscrewing and removing threaded pin 53, and removing annular baffle member 51 by an axial sliding motion. Annular baffle member 51 can thus be removed without destroying it. Also, no debris or other residues are left on the rotor body. Cleansing of the rotor body in preparation of re-installing a baffle assembly may be omitted or be restricted to a minimum effort. Annular baffle member 51 may be refurbished and reused.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

The invention claimed is:

1. A turbogenerator rotor, the rotor comprising:
   a rotor body having two axial ends;
   a trunnion axially extending from each axial end of the rotor body; and
   at least one baffle assembly provided on the circumference of the rotor body, the baffle assembly comprising at least one baffle member reversibly attached to the rotor body.

2. The turbogenerator rotor according to claim 1, wherein the at least one baffle assembly comprises at least one pre-manufactured structural baffle member.

3. The turbogenerator rotor according to claim 1, wherein a radial gap is provided between the at least one baffle member and the rotor body.

4. The turbogenerator rotor according to claim 1, wherein a gasket is provided between the at least one baffle member and the rotor body, whereby the gap between the baffle member and the rotor body is closed.

5. The turbogenerator rotor according to claim 1, wherein at least one baffle member is provided with at least one through opening, wherein a pin extends from the rotor body into the through opening.

6. The turbogenerator rotor according to claim 5, wherein the pin and the through opening of the at least one baffle member are dimensioned so as to fixate the at least one baffle member in the axial and circumferential directions of the rotor.

7. The turbogenerator according to claim 5, wherein the pin and the through opening of the at least one baffle member are dimensioned so as to enable an unrestricted displacement of the pin through the through opening along an axis of the pin.

8. The turbogenerator according to claim 5, wherein the through opening comprises a shoulder which is configured and provided to bear against one of a corresponding shoulder provided on the pin and/or a corresponding surface of a locking element provided to be attached to the pin.

9. The turbogenerator rotor according to claim 5, wherein the pin is provided with at least one thread and threadedly engages the rotor body.

10. The turbogenerator rotor according to claim 1, wherein the baffle assembly comprises a circumferentially closed annular ring member which exhibits an inner diameter, wherein in particular the inner diameter of the closed ring member is larger than a corresponding outer diameter of the rotor body.

11. The turbogenerator rotor according to claim 1, wherein the baffle assembly comprises at least two ring segments, wherein each ring segment exhibits an inner radius which is equal to or larger than a corresponding outer radius of the rotor body.

12. A turbogenerator, comprising a stator and a rotor, wherein an axially extending radial gap is provided between the stator and a rotor body of the rotor, the gap comprising two axial ends, the gap at at least one axial end being-partially constricted by a baffle assembly, while leaving a residual gap open, wherein at least one baffle member of the baffle assembly is reversibly attached to an outer circumference of the rotor body.

13. A method of furnishing a turbogenerator rotor with at least one baffle assembly, the method comprising:
attaching the at least one baffle assembly on an outer circumference of a rotor body of the rotor of the turbogenerator, wherein:
pre-manufacturing at least one baffle member, thereby providing the at least one pre-manufactured baffle member with the at least one baffle assembly, and reversibly attaching the at least one pre-manufactured baffle member on the outer circumference of the rotor body of the rotor.

14. A method of refurbishing a turbogenerator rotor, the method comprising
detaching a used baffle assembly from an outer circumference of a rotor body of the rotor;
providing at least one pre-manufactured baffle member to the baffle assembly; and
attaching the at least one pre-manufactured baffle member of the baffle assembly on the outer circumference of the rotor body of the rotor,
wherein attaching the at least one pre-manufactured baffle member comprises applying a reversible attachment method.

* * * * *